Aug. 31, 1948. P. B. SHEE 2,448,196
CREAM SEPARATOR DRIVE
Filed April 13, 1944
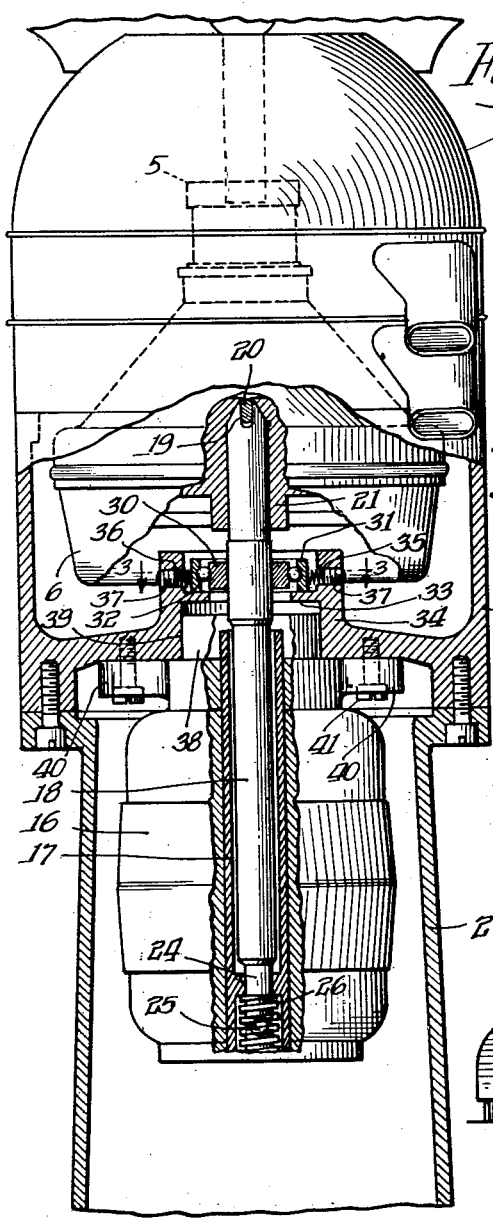
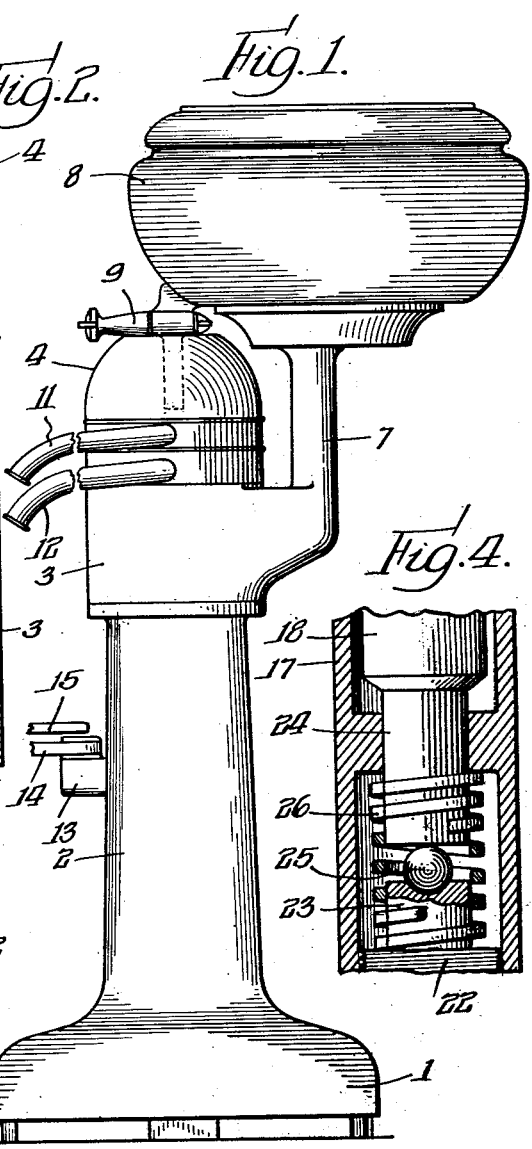
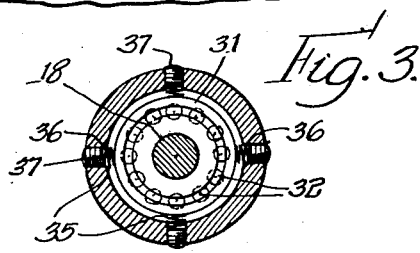
INVENTOR.
Parke B. Shee
BY Louis Sheldon
Sellers
attys Patented Aug. 31, 1948

2,448,196

UNITED STATES PATENT OFFICE 2,448,196

CREAM SEPARATOR DRIVE

Parke B. Shee, Oak Park, Ill., assignor to Sears, Roebuck and Co., Chicago, Ill., a corporation of New York Application April 13, 1944, Serial No. 530,916

1 Claim. (Cl. 233—24)

This invention relates to centrifugal cream separators, and it is particularly concerned with the drive connection between a motor and the centrifugal bowl or separating element of the machine. One object of the invention is to provide a new and improved drive connection for a separator of this type.

Another object of the invention is to provide a motor having a hollow shaft in combination with the rotary element of the cream separator and a spindle therefor extending into the hollow shaft of the motor with clearance and with yieldable bearing means for the spindle permitting the rotor to seek its own axis of rotation which may not exactly coincide with that of the motor shaft. It is also an object of the invention to provide a drive coupling between the motor and the rotor of a centrifugal separator which will automatically release the rotor when the motor speed drops below that of said rotor or when the motor is stopped so that the rotor may continue spinning under its own momentum.

Other objects and advantages of the invention will appear from the following description taken in connection with the drawings in which:

Fig. 1 is a side elevation of a cream separator embodying this invention with certain parts broken away or omitted to somewhat condense the view.

Fig. 2 is an enlarged partial elevational view partly in section indicating the location of the bowl or rotor of the separating mechanism and the relation thereto of an electric driving motor together with drive connections between said parts.

Fig. 3 is a transverse detail section taken as indicated at line 3—3 on Fig. 2.

Fig. 4 is an axial detail section showing the spring drive connection substantially as in Fig. 2, but on a larger scale.

While there is shown and described herein certain specific structure embodying the invention, it will be manifest to those skilled in the art that various modifications and re-arrangements of the parts may be made without departing from the spirit and scope of the invention, and that the same is not limited to the particular form herein disclosed, except in so far as indicated by the appended claim.

The cream separator shown in Fig. 1 is supported upon a pedestal comprising a base portion 1 and a hollow column 2 surmounted by a casing 3 having a dome-shaped top 4 within which there is located the feed cup indicated in dotted outline at 5 and the bowl or rotor 6 of the centrifugal separating mechanism. A bracket arm 7 extending from the casing 3 supports a vessel or tank 8 into which the milk is poured and from which it is released by a control valve 9 to the feed cup 5 of the separator. A discharge spout for the separated cream is shown at 11 and a discharge spout for the milk is indicated at 12 arranged in the usual manner. A lug 13 supports a swinging bracket 14 carrying a shelf 15 on which a receptacle for the cream may be placed, the shelf and its bracket being only fragmentarily illustrated in Fig. 1.

It may be understood that in a machine of this type the bowl or rotor 6 revolves at a suitable separating speed so that unless its center of gravity coincides quite accurately with its axis of revolution, a violent vibration will be set up which may seriously injure the machine or which will at least cause rapid wear of the bearings and reduction in the efficiency. The present invention therefore provides a construction which permits the bowl 6 to seek its own axis of revolution without strain or injury to the drive connections. The driving motor 16, instead of having the usual solid shaft, is provided with a hollow shaft 17 suitably journaled for rotation in any preferred manner and the motor 16 is disposed within the hollow column 2 of the pedestal with the axis of its shaft extending vertically therein and in substantial alinement with the axis of the bowl 6.

Within the hollow shaft 17 of the motor 16 there extends a spindle 18 having an external diameter which is somewhat less than the internal diameter of the shaft 17 so as to provide some clearance if the spindle 18 should be slightly misalined with the shaft 17. At its upper end said spindle is formed with a transverse slot 19 and the bowl 6 includes a key element 20 which interengages with the slot 19 to provide a driving connection between the spindle and bowl. This upper slotted end of the spindle fits into the bore of the central hub 21 of the bowl 6, said bore fitting snugly over the upper end portion of the spindle 18 to position the bowl firmly thereon. At the lower end of the hollow motor shaft 17 there is inserted a plug 22 having a reduced upstanding terminal 23 which extends adjacent the reduced lower end 24 of the spindle 18 as best seen in Fig. 4. A hardened steel ball 25 is interposed between the part 23 and the portion 24 and a coil spring 26 yieldingly embraces said reduced portion 23 of the plug and the reduced portion 24 of the spindle, these parts being preferably of the same diameter. The normal internal diameter of the coil spring 26 is slightly less than the diameter of these parts 23 and 24, so that when the spring is fitted over them it hugs their surfaces with an initial frictional grip. The spring 26 is coiled in such a direction that when the motor shaft 17 begins to turn in its normal direction for operating the separator the frictional drag between the internal surface of the coil spring 26 and the parts 23 and 24 causes the coil to be tightened around said parts so as to serve as an effective drive connection between the motor and the spindle 18. But when the separator bowl 6 has attained its desired rotational velocity, a slackening of the motor speed will produce a reversal of the part 23 with respect to the part 24 as the bowl continues to spin under its momentum, and this relative reverse rotation will release the frictional torque upon the driving spring 26, allowing the spindle 18 to overrun the motor shaft and to continue spinning quite freely even after the motor 16 has stopped. This is a safety factor allowing the bowl to spin if the motor has stopped for any reason.

As already noted, the separator bowl 6 and its spindle 18 rotating at a high speed will have a strong tendency to seek their own axis of rotation, depending upon the exact location of the center of gravity of the parts. To permit this, a yielding bearing is provided for the upper end of the spindle 18 adjacent its connection with the bowl 6. This bearing is shown in Fig. 2 as comprising an inner ball race 30 fixed to the spindle 18, an outer ball race 31 and a series of bearing balls 32 interposed between the raceways. The ball bearing rests on a flange 33 projecting inward from a collar 34 formed on the casing 3 and is positioned radially by springs 35 supported in sockets 36 in the collar, with threaded plugs 37 backing up said springs and adjustable for tensioning them. The internal wall of the collar 34 above the flange 33 is of such a diameter as to provide clearance around the outer ball race 31 so that if the spindle 18 tends to assume a position in which it is not strictly coaxial with the hollow shaft 17 the springs 36 may yield and the spindle 18 may shift while the bowl 6 is revolving so as to allow the bowl and spindle to assume their natural position of rotation in a condition of running balance. If this results in a slight misalinement of the spindle 18 with respect to the axis of the hollow shaft 17 and the reduced terminal 23 the flexibility of the drive spring 26 will permit accommodation of the parts.

The construction shown permits of a relatively compact arrangement with the spindle 18 of sufficient length to accommodate its upper end to a self-centered position of the rotor 6 without producing undue obliquity of the spindle. As shown, the upper end of the casing of the motor 16 includes a cylindrical portion 38, which fits snugly into a recess 39 in the annular part 34 of the casing 3 and adjacent this portion 38 the motor casing may have lugs or ears 40 arranged to receive screws 41 which extend upwardly into the transverse lower wall of the casing 3 for anchoring the motor in position.

I claim:

In a centrifugal separator including a bowl, a spindle depending from said bowl, a motor having a hollow vertical shaft with a bearing of relatively short axial extent for the lower end of said spindle, said bearing permitting transaxial movement of said spindle relative to said shaft, radially yieldable means associated with said spindle and remote from the lower end of said spindle and tending to maintain said spindle coaxial with said shaft, said shaft having a coaxial projection, a thrust bearing between said projection and spindle and on which the bottom of said spindle rests, and a clutch spring embracing and bridging said projection and spindle and operative to transmit a one-way drive from said shaft to said spindle while permitting said spindle to rotate about an axis other than the axis of said shaft.

PARKE B. SHEE.

REFERENCES CITED

The following references are of record in the file of this patent:

UNITED STATES PATENTS

| Number | Name | Date |
|---|---|---|
| 392,583 | Braun | Nov. 13, 1888 |
| 2,085,929 | Stratford et al. | July 6, 1937 |

FOREIGN PATENTS

| Number | Country | Date |
|---|---|---|
| 41,932 | Denmark | Mar. 31, 1930 |
| 434,723 | France | Dec. 5, 1911 |
| 118,278 | Switzerland | Jan. 3, 1927 |